(12) United States Patent
Yeo et al.

(10) Patent No.: US 9,677,900 B2
(45) Date of Patent: Jun. 13, 2017

(54) METHOD AND APPARATUS FOR PROVIDING ROUTE GUIDANCE USING REFERENCE POINTS

(71) Applicant: Samsung Electronics Co., Ltd., Gyeonggi-do (KR)

(72) Inventors: Jae Yung Yeo, Gyeonggi-do (KR); Byoung Tack Roh, Gyeonggi-do (KR); Cheol Ho Cheong, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/824,158

(22) Filed: Aug. 12, 2015

(65) Prior Publication Data

US 2016/0047661 A1    Feb. 18, 2016

(30) Foreign Application Priority Data

Aug. 12, 2014   (KR) .................. 10-2014-0104344

(51) Int. Cl.
*G01C 21/36* (2006.01)

(52) U.S. Cl.
CPC ..... *G01C 21/3644* (2013.01); *G01C 21/3641* (2013.01)

(58) Field of Classification Search
CPC .................. G01C 21/3644; G01C 21/3641
See application file for complete search history.

(56) References Cited

U.S. PATENT DOCUMENTS

| | | | | |
|---|---|---|---|---|
| 4,688,176 A | * | 8/1987 | Hirata | G01C 21/30 701/445 |
| 6,681,178 B1 | * | 1/2004 | Inoue | G01C 21/26 701/410 |
| 8,095,308 B2 | * | 1/2012 | Tsuji | G01C 21/30 701/437 |
| 8,566,035 B2 | * | 10/2013 | Boss | G01C 21/3492 701/533 |
| 2007/0005241 A1 | * | 1/2007 | Sumizawa | G09B 29/10 701/437 |
| 2008/0262714 A1 | * | 10/2008 | Abramovich Ettinger | G01C 21/00 701/533 |
| 2008/0262717 A1 | * | 10/2008 | Ettinger | G01C 21/3476 701/467 |
| 2012/0135382 A1 | * | 5/2012 | Winston | G09B 19/167 434/65 |

FOREIGN PATENT DOCUMENTS

| | | |
|---|---|---|
| JP | 2002-350154 A | 12/2002 |
| JP | 2002-350155 A | 12/2002 |
| JP | 2004-245679 A | 9/2004 |

\* cited by examiner

*Primary Examiner* — Rodney Butler
*Assistant Examiner* — Frederick Brushaber
(74) *Attorney, Agent, or Firm* — Cha & Reiter, LLC

(57) ABSTRACT

Disclosed is a method and device for providing a route guidance. Information on a plurality of user inputted route points may be obtained. One or more reference points, such as landmarks, may be determined based at least on the obtained information. Route guidance may be provided, which includes information on the reference points, thereby providing users with a more intuitive route guidance.

18 Claims, 12 Drawing Sheets

METHOD AND APPARATUS FOR PROVIDING ROUTE GUIDANCE USING REFERENCE POINTS

CLAIM OF PRIORITY

This application claims the benefit under 35 U.S.C. §119 (a) of a Korean patent application filed on Aug. 12, 2014 in the Korean Intellectual Property Office and assigned Serial number 10-2014-0104344, the entire disclosure of which is hereby incorporated by reference.

BACKGROUND

1. Technical Field

The present disclosure relates generally to electronic route guidance (navigation) technology.

2. Description of the Related Art

A route guidance function typically provided by a navigation device installed individually in a vehicle can now be provided through an application installed in an electronic device such as a smartphone, a tablet, or the like. Furthermore, a desktop computer, a laptop computer, or the like may also provide a route guidance function, a way-finding function, a map search function, and so forth by accessing a website that provides map information (e.g., maps.google.com, maps.naver.com, etc.) or by using an installed application. Herein, a "navigation device" will refer to any electronic device capable of providing a navigation function.

A typical route guidance function is generally performed on a turn-by-turn basis so that a user is instructed to change a moving direction of a selected means of transportation (e.g., a vehicle, a bicycle, on foot) at a point where a road or an intersection is changed in terms of a road name.

According to typical turn-by-turn based route guidance, an appropriate guidance may be provided to a user at a branch point such as an intersection. However, the user (or driver) may not understand an overall travel route, but rather simply changes a direction according to guidance of a navigation device to arrive at a destination. In this case, the user may be unable to remember the route even if the driver has been to the destination previously (one or more times).

FIGS. 1A and 1B illustrate screen examples of conventional route guidance. If a user inputs a start point 110 and a destination 120 and selects a traveling method 130 as illustrated in FIG. 1A, an electronic device may provide a map-based route guidance, as illustrated in FIG. 1B, such as a shortest or optimal route that connects the start point 110 and the destination 120. However, since a map screen 140 displays a large-scale map, it may be difficult for the user to intuitively understand what route the user should travel along. In general, the user may check a detailed route from the start point to the destination by selecting a details button 150. However, this requires additional action by the user and may be distracting to the user if driving.

SUMMARY

An aspect of the present disclosure is to provide a technology for providing a route guidance including various reference points (e.g. landmarks) for improving a user's recognition.

Another aspect of the present disclosure is to provide a technology for providing a user friendly route guidance by allowing reference points to be selected or determined based on user experience.

In accordance with illustrative embodiments of the present disclosure, a method and electronic device for providing route guidance are provided. Information on a plurality of points, such as user inputted route points, is obtained. One or more reference points are determined based at least on the obtained information. Route guidance which includes information on the reference points is provided. Advantageously, a more intuitive route guidance may thereby be provided.

DETAILED DESCRIPTION

Figure 1A:
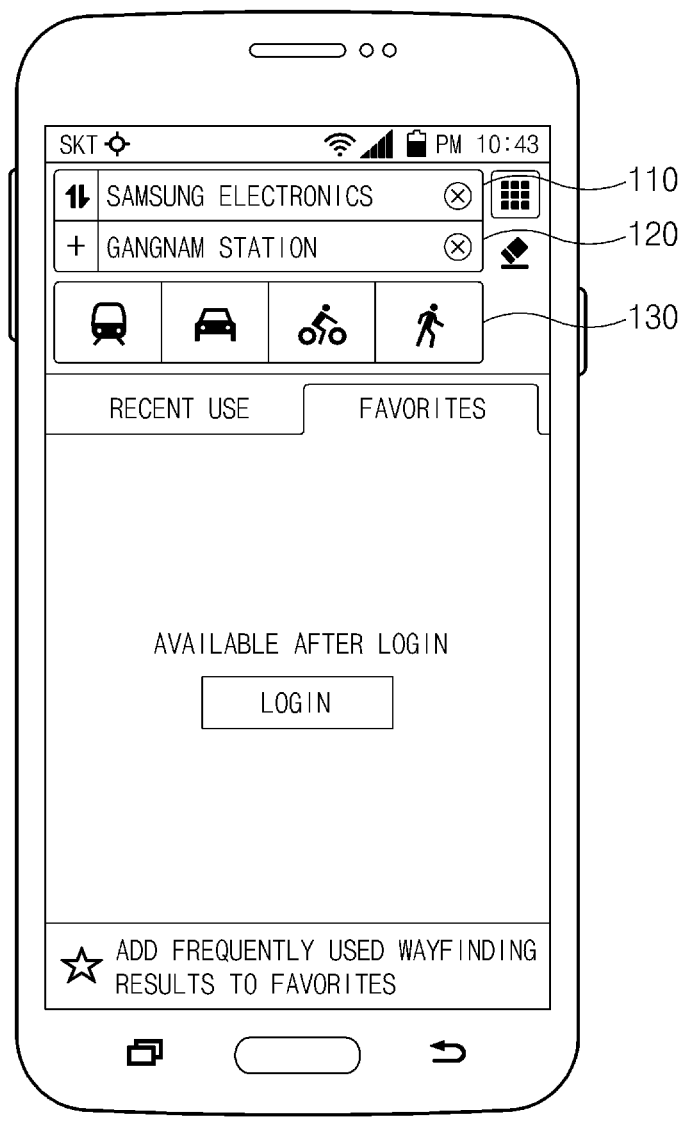
FIG. 1A illustrates a screen example of a conventional route guidance.
Figure 1B:
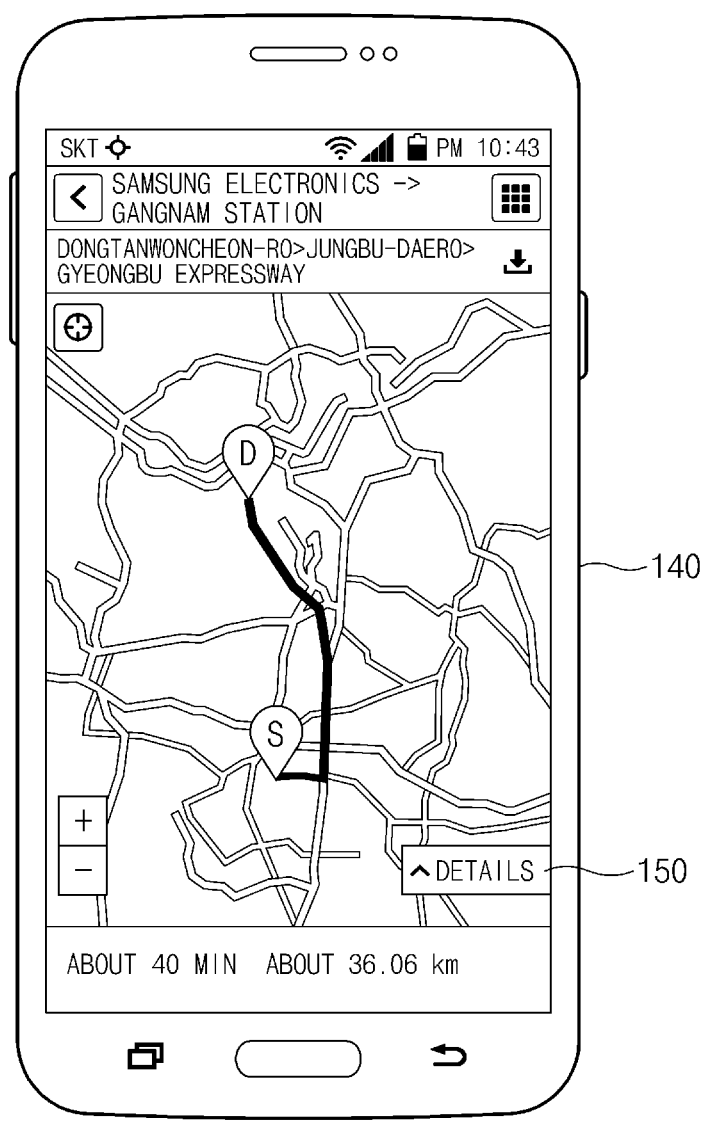
FIG. 1B illustrates another screen example of a conventional route guidance.

Hereinafter, various embodiments of the present disclosure will be described with reference to the accompanying drawings. The present disclosure may be variously modified and may include various embodiments. However, specific embodiments are exemplarily illustrated in the drawings and detailed descriptions related thereto are provided. However, it should be understood that various embodiments of the present disclosure are not limited to specific examples but rather include all modifications, equivalents and alternatives that fall within the sprit and scope of various embodiments of the present disclosure. Regarding the drawings, like reference numerals refer to like elements.

The term "include," "comprise," "including," or "comprising" used herein indicates disclosed functions, operations, or existence of elements but does not exclude other functions, operations or elements. It should be further understood that the term "include", "including", "comprise", "comprising", "have", or "having" used herein specifies the presence of stated features, numbers, operations, elements, components, or combinations thereof but does not preclude the presence or addition of one or more other features, numbers, operations, elements, components, or combinations thereof.

The meaning of the term "or" or "at least one of A and/or B" used herein includes any and all combinations of words listed together with the term. For example, the wording "A or B" or "at least one of A and/or B" may indicate A, B, or both A and B.

The terms such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, a first user device and a second user device indicate different user devices. For example, without departing the scope of the present disclosure, a first element may be named as a second element, and similarly, a second element may be named as a first element.

It will be understood that when an element is referred to as being "connected" or "coupled" to another element, it can be directly connected or coupled to the other element or intervening elements may be present. In contrast, when an element is referred to as being "directly connected" or "directly coupled" to another element, it should be understood that there are no intervening elements.

The terminology used herein is not for delimiting the present disclosure but for describing specific various embodiments of the present disclosure. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal detect unless otherwise defined explicitly.

Electronic devices according to various embodiments of the present disclosure may have a route guidance function. For example, the electronic devices may include at least one of smartphones, tablet personal computers (PCs), mobile phones, video telephones, electronic book readers, desktop PCs, laptop PCs, netbook computers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., head-mounted-devices (HMDs) such as electronic glasses, an electronic apparel, electronic bracelets, electronic necklaces, electronic appcessories, electronic tattoos, or smart watches).

According to various embodiments of the present disclosure, the electronic devices may be smart home appliances having a route guidance function. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (e.g., Samsung HomeSync™, Apple TV™, or Google TV™), game consoles, electronic dictionaries, electronic keys, camcorders, or electronic picture frames.

According to various embodiments of the present disclosure, the electronic devices may include at least one of navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs) having a route guidance function.

According to various embodiments of the present disclosure, the electronic devices may include at least one of parts of vehicles, furniture or buildings/structures, electronic boards, electronic signature receiving devices, or projectors having a route guidance function. The electronic devices according to various embodiments of the present disclosure may be one or more combinations of the above-mentioned devices. Furthermore, the electronic devices according to various embodiments of the present disclosure may be flexible devices. It would be obvious to those skilled in the art that the electronic devices according to various embodiments of the present disclosure are not limited to the above-mentioned devices.

Hereinafter, electronic devices according to various embodiments of the present disclosure will be described with reference to the accompanying drawings. The term "user" used herein may refer to a person who uses an electronic device or may refer to a device (e.g., an artificial electronic device) that uses the electronic device.

Figure 1C:
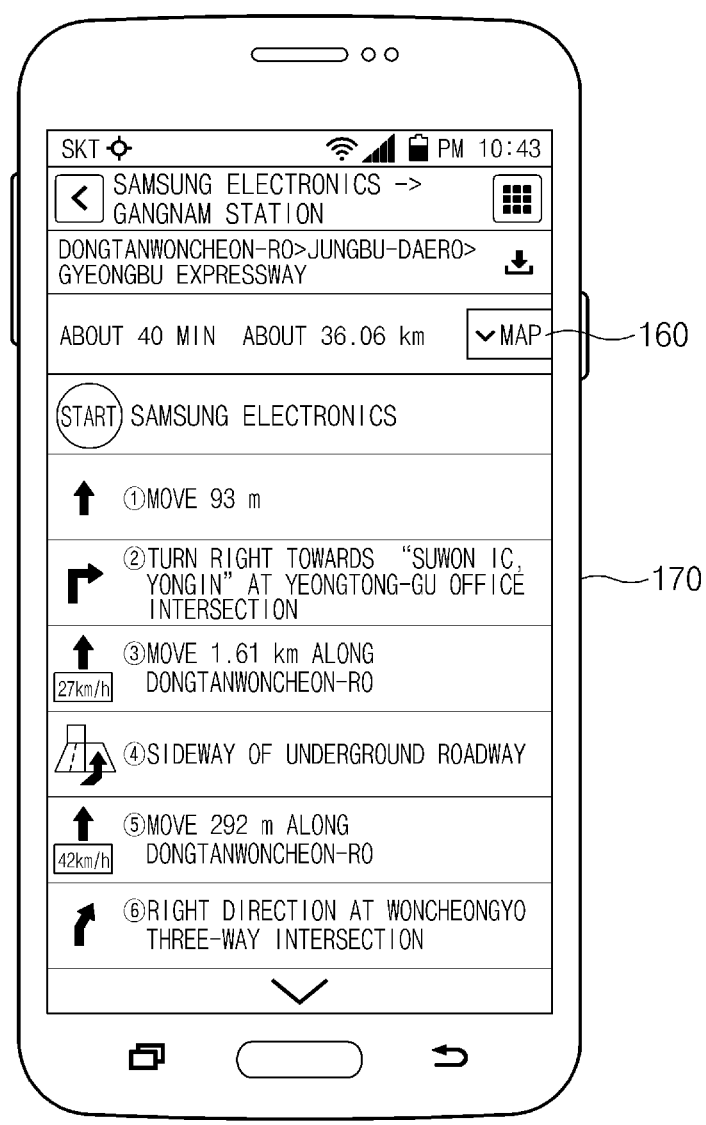
FIG. 1C illustrates still another screen example of a conventional route guidance.

FIG. 1C illustrates a conventional electronic device and route guidance screen. While a guidance on a route from a start point 110 to a destination 120 is provided on a turn-by-turn basis, a guidance may be provided, in some sections, with respect to a path of which a distance is very short, for example, 93 m or 292 m, compared to that of the entire route. With such short sections interposed with substantially longer sections, it may be difficult for the user to readily determine what routes should be selected in order to travel from the start point 110 to the destination 120. Furthermore, even if a point that may aid a user's recognition, such as a famous landmark, exists near a road or path on the route, guidance on the point is not provided if the user does not pass directly through the point. For instance, if a recognizable building is not directly connected to a highway of a route but is easily viewed by the user when the user moves along the highway, no information on the building is provided to the user with conventional route guidance. Similarly, if the building that could serve as a road landmark is directly located on a street of a route, the user is not made aware of the building.

Figure 2:
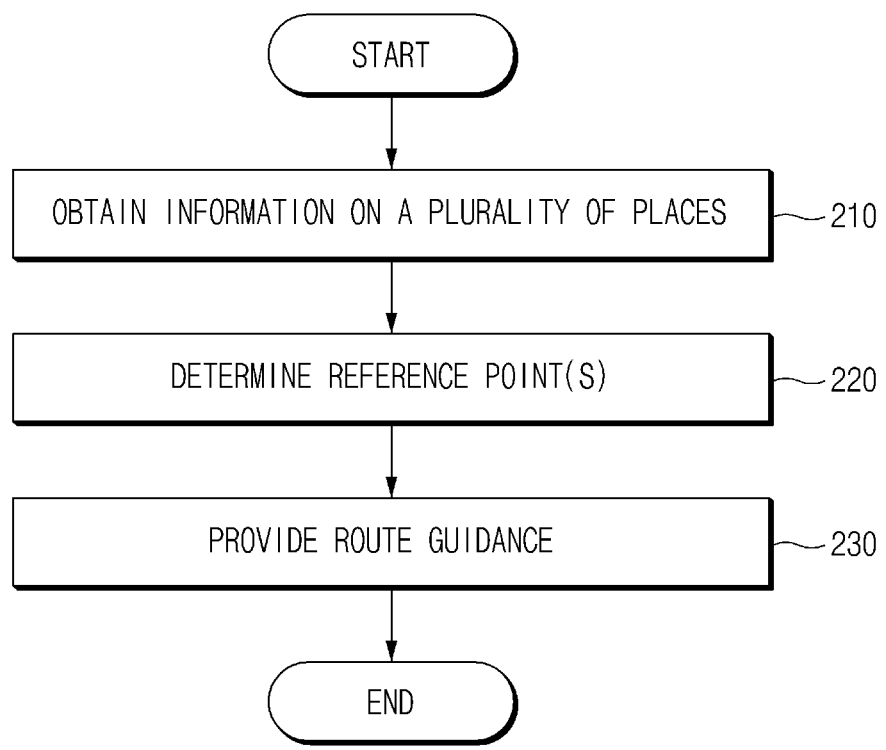
FIG. 2 illustrates a route guidance process according to various embodiments of the present disclosure.

FIG. 2 illustrates a route guidance process according to various embodiments of the present disclosure. In this process, an electronic device may first obtain input information from the user on a plurality of places, e.g. start point, destination point, of a desired guidance route in operation 210. This information may be obtained using any of various input devices such as a touch screen, a voice recognition module, a physical keyboard, or the like. For example, an electronic device such as a smartphone may receive an input on a start point or a destination through a touch input to a virtual keyboard displayed on a screen.

In various embodiments of the present disclosure, the electronic device may receive an input on a destination alone. In this case, the electronic device may determine a current location of the electronic device using a GPS sensor, a positioning module based on Wi-Fi or mobile communications such as GSM, or the like. This current location may correspond to the start point of a route.

In various embodiments, the electronic device may receive an input on another (non-final) destination or a route point. Thus the electronic device may provide a route guidance on two or more destinations. The device may provide guidance on a route connecting a start point→a first destination (or a route point)→a second destination.

In operation 220, the electronic device may determine at least one "reference point" based on the obtained information on the plurality of places or points. Herein, a reference point is typically a landmark, which is an object or structure on land that is generally easy to recognize. Note that in the present disclosure, a reference point is not to be confused with a route point or a destination point. Furthermore, a reference point is not to be confused with information on a point where a driver should make a left turn, a right turn, or a U-turn or intersection information provided by a turn-by-turn guidance. The concept of the reference point includes a place, a building, nature, or the like that may be used as an indicator when a user moves along a set route.

For example, in the case where the user passes through a specific intersection or makes a right turn at the intersection, the intersection may correspond to a place for providing a route guidance (turn-by-turn guidance), but a famous building located at a corner of the intersection may correspond to a reference point indicating that the building is located adjacent to a road or path on the user's route. In a conventional route guidance, the building may be input as a route start point or destination point. The electronic device may also generate a route that passes through the building so as to provide a precise guidance to the user (for example, guide to a front entrance or a parking lot of the building, where the parking lot or front entrance are inputted as start/destination points). However, if the building is set by the electronic device as a reference point according to various embodiments of the present disclosure, the reference point may be used to help guide the user along the route from a start point to a destination. In this case, one or more reference points including the set reference point may be used for a route guidance.

As an example, in the case where a driver moves along a route set based on a start point and a destination, the driver may pass along a street with a landmark (e.g., the 63 Building, the Seoul Arts Center, or the like). With a conventional navigation method, the electronic device provides no guidance at points of landmarks unless a left turn, a right turn, or the like is required at these points, even though the landmarks could be helpful in improving user's recognition on a route. In various embodiments of the present disclosure, however, when a reference point or landmark is on a street or visible from a road on the route, the electronic device may provide information (e.g., a name or an image of a reference point, a ratio of a distance traveled to the reference point to a total length of a route, or the like) on the reference point, thereby guiding the user in an intuitive way.

Various methods for setting a reference point will be described later with reference to FIG. 7.

With continuing reference to FIG. 2, in operation 230, the electronic device may provide a route guidance including information on a reference point. In various embodiments of the present disclosure, the route may be determined by the plurality of points (e.g., a start point, a destination, and, if necessary, an intermediate route point). Furthermore, in various embodiments of the present disclosure, the route may further include the reference point in addition to the plurality of points. The route guidance including the information on the reference point will be described with reference to FIGS. 3 and 4.

Figure 3:
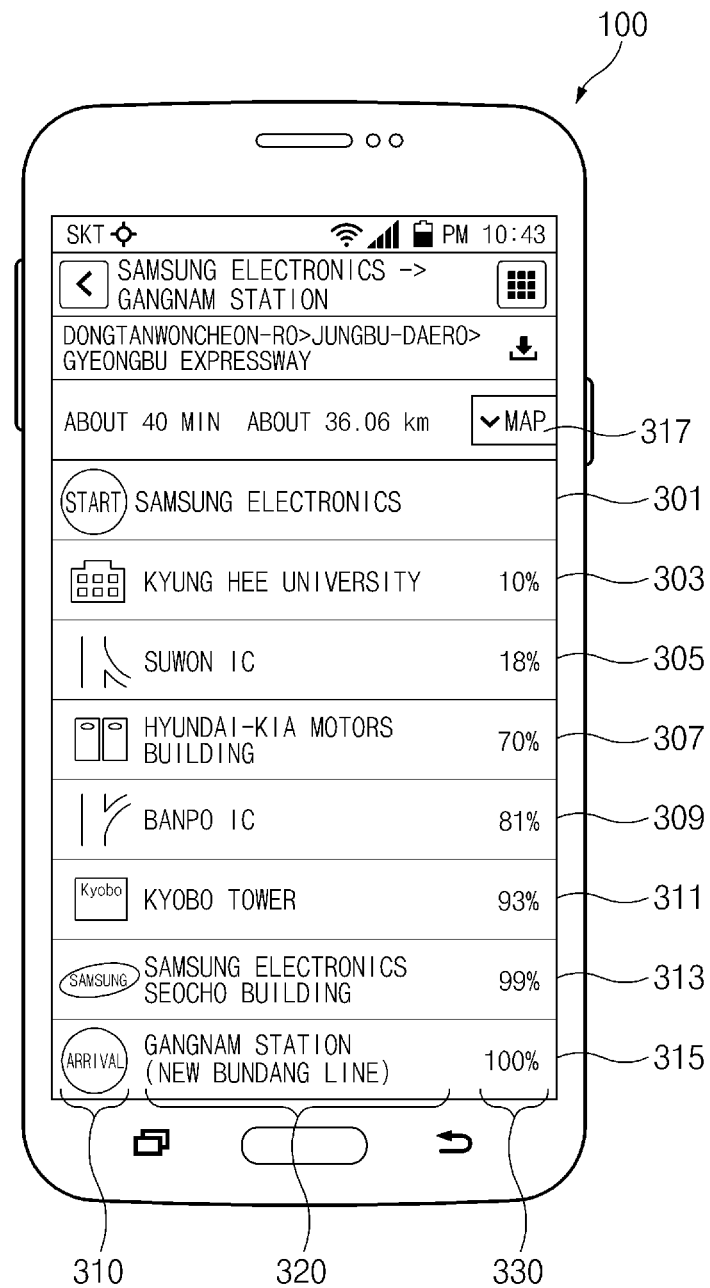
FIG. 3 exemplarily illustrates a screen of route guidance based on a reference point according to various embodiments of the present disclosure.

FIG. 3 illustrates an example screen of route guidance based on one or more reference points according to various embodiments of the present disclosure. With the type of screen in FIG. 3, reference points themselves may guide the user along the route without any need to mention roads, turns, or other guidance. In this case, the user may be assumed to know how to travel between reference points. Moreover, a map icon 317 may allow a user to transition from strictly a reference point based guidance screen to a map-based guidance screen.

In the example, an electronic device 100 may obtain information on a start point (e.g., Samsung Electronics) and a destination (e.g., Gangnam station). As described above, start point information may be obtained through a positioning module, and two or more destinations (one or more intermediate destinations and a final destination) may exist on a user requested route. For convenience, it is assumed that Samsung Electronics is set to be a start point and Gangnam station is set to be only one destination to provide a route guidance.

Device 100 may extract a reference point between the set start point and destination. The reference point may be stored in a storage location such as a memory of the electronic device. In various embodiments, the electronic device may transmit, to an external device (e.g., a server or the like), information on a route (e.g., an initial route or a primary route) generated based on the start point and the destination.

Device 100 may provide route guidance on an entire route, where the guidance includes guidance instructions referring to the extracted reference point. Device 100 may provide, to the user, an expression, a graph, or an image indicating to what portion of the entire route each reference point corresponds. In the example of FIG. 3, the entire route may include a guidance (items 301, 303, 305, 307, 309, 311, 313, and 315) using Kyung Hee University, Suwon IC, Hyundai-Kia Motors Building, Banpo IC, Kyobo Tower, and Samsung Electronics Seocho Building as reference points. Each item may include an area 310 showing an image or a logo of a corresponding reference point, an area 320 showing a name of a corresponding reference point, and an area 330 showing a ratio of a distance between the start point to a corresponding point to a total length of the entire route (or a time estimated to arrive at a corresponding point). For example, referring to the guidance item 307, an image of the Hyundai-Kia Motors Building and information indicating that the ratio of the distance to the corresponding reference point to the total length of the entire route (about 36.06 km) is about 70% (i.e., about 25 km traveled from the start point) may be provided. Actually, any of the reference points, such as the Hyundai-Kia Motors Building, may not be located on a street of the travel route but may come into sight from the road (e.g., the Hyundai Building merely comes into sight at the right side of a driver moving along the Gyeongbu Expressway). However the user may better understand the entire route by virtue of such a reference point, and may be intuitively aware of a distance traveled towards the destination.

Figure 4:
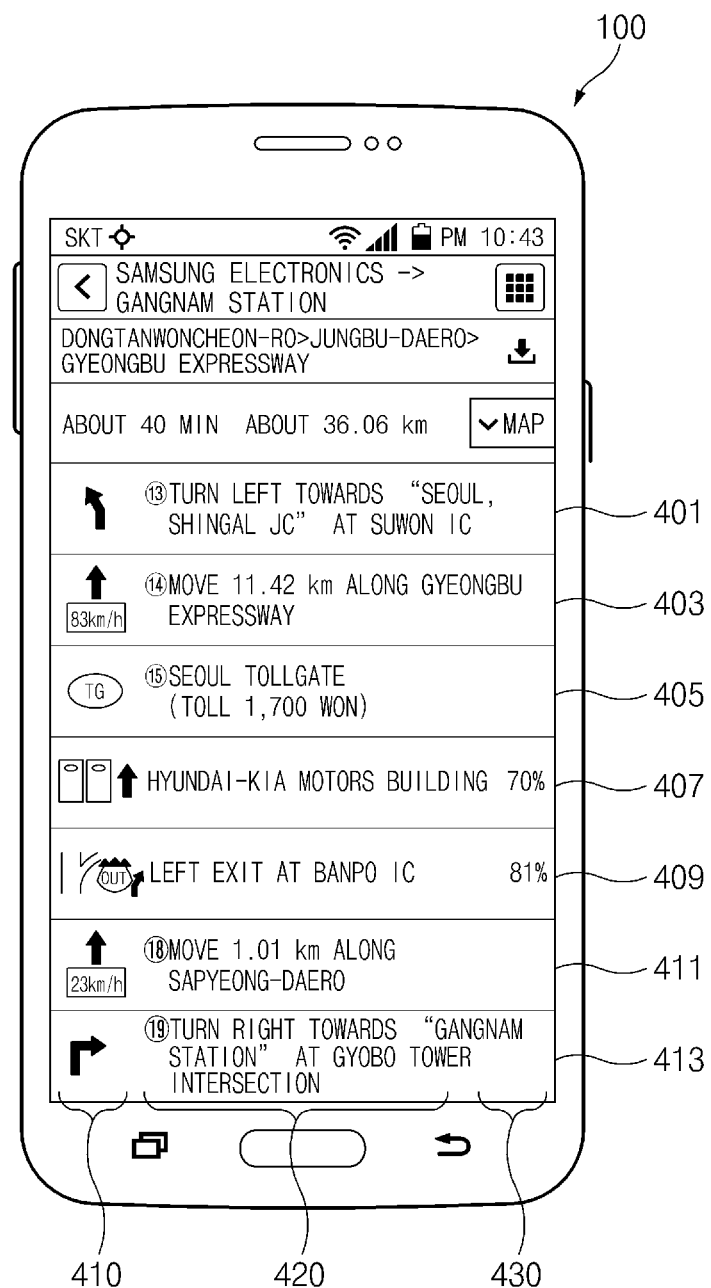
FIG. 4 exemplarily illustrates a screen of route guidance based on a combination of guidance on a reference point and turn-by-turn guidance according to various embodiments of the present disclosure.

FIG. 4 illustrates an example screen of route guidance based on a combination of guidance on a reference point and turn-by-turn guidance, according to various embodiments of the present disclosure.

The example of FIG. 3 illustrates an embodiment in which the entire route may be represented by reference points alone. In the embodiment of FIG. 4, turn-by-turn information between reference points is also be provided while information on reference points may be provided in consideration of a length and complexity of the entire route. For example, the shown guidance items 401, 403, 405, 411, and 413 provide turn-by-turn type information, while guidance items 407 and 409 provide information on respective reference points.

Any area 310 of FIG. 3 which shows an image or a logo of a corresponding reference point may be substituted with an image area 410 of FIG. 4 which shows a turn-by-turn guidance. In the case of an item that provides guidance information on a reference point, the area 320 of FIG. 3 which shows a name of a reference point may be substituted with a text area 420 of FIG. 4 which provides a turn-by-turn guidance. The area of FIG. 3 which shows a ratio of a distance to a corresponding point to the total length of the entire route (or an estimated time to arrive at a corresponding point) may be omitted or may be provided only to an item that provides guidance information on a reference point (e.g., the guidance items 407 and 409).

Guidance information illustrated in FIG. 4 may be displayed in response to a user input made to the screen of FIG. 3. For example, if the user selects the Hyundai-Kia Motors Building item 307 from the screen of FIG. 3, turn-by-turn guidance information corresponding to a section between the Suwon IC 305 and the Hyundai-Kia Motors Building item 307 may be provided, such as the "go straight" arrow shown as part of item 407. Furthermore, embodiments may allow for guidance information to be removable in response to user inputs. For example, if the user selects the Hyundai-Kia Motors Building item 407 from the screen of FIG. 4, turn-by-turn guidance information (e.g., the guidance items 401, 403, and 405) corresponding to a section between the Suwon IC (not shown) and the Hyundai-Kia Motors Building item 407 may be folded or disappear, and just information on the Suwon IC as a reference point may be provided. Additional turn-by-turn route guidance may also be provided for each section based on reference points. In the example illustrated in FIG. 4, if the user selects the guidance item 409 (guidance on a reference point, i.e., Banpo IC), a list of turn-by-turn guidance instructions between the guidance item 407 and the guidance item 409 may be provided.

In various embodiments of the present disclosure, a reference point may be usefully provided for route guidance under complicated road conditions such as an intersection (e.g., a roundabout), alleyways, or an old town of a city. For example, at a complicated intersection (e.g., a roundabout), a route guidance based on two or more reference points, such as "enter between McDonald's® and Starbucks®", may be provided instead of a turn-by-turn guidance such as "10 o'clock direction" or "third exit". Alternatively, a route guidance based on one reference point, such as "turn right at Paris Baguette", may be provided. Hence a reference point may be provided for route guidance so that a driver is guided with ease at a place where turn-by-turn guidance is complicated or hardly understandable by the driver. In the abovementioned embodiments, a point where a turn-by-turn guidance is provided and a location of a reference point may be construed as substantially the same area. In this case, the reference point may be used for enhancing a turn-by-turn guidance.

Figure 5:
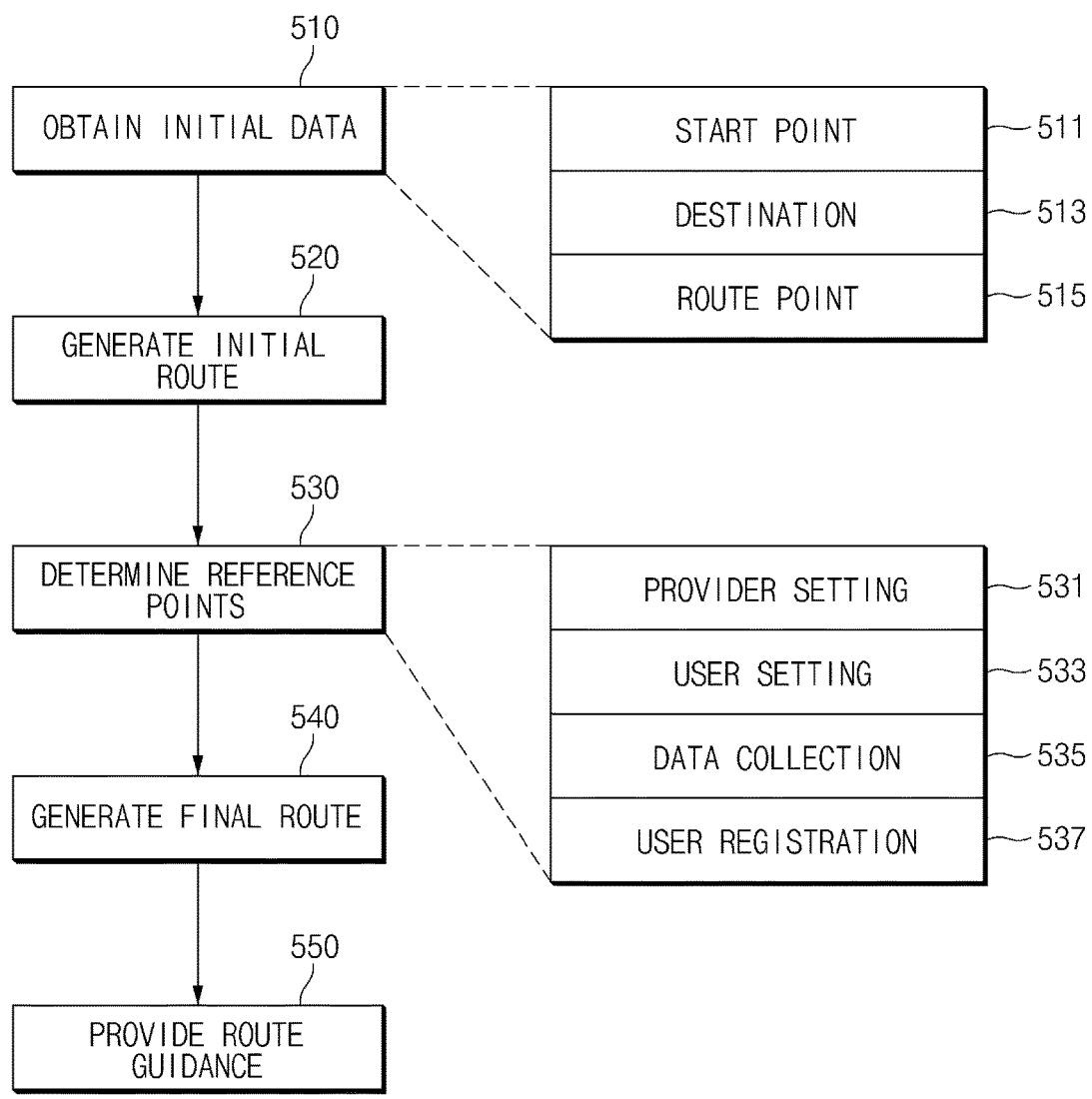
FIG. 5 illustrates a process of designing a route using a reference point according to various embodiments of the present disclosure.

FIG. 5 illustrates a process of designing a route using a reference point according to various embodiments of the present disclosure. Initially, an electronic device may obtain initial data in operation 510. The initial data may be information on a plurality of points such as a start point 511, a destination 513, and an intermediate route point 515. As described above, one or more intermediate route points 515 as well as a final destination may be inputted by a user. The start point 511 may be determined based on a current location of the electronic device obtained using a positioning module, or inputted by the user.

According to various embodiments of the present disclosure, the electronic device may generate an initial route based on the plurality of points in operation 520. This initial route may be determined by the initial data obtained in operation 510. The initial route may be set to be a shortest distance route connecting the plurality of points, a shortest time route, an optimal route to which real-time traffic conditions are applied, or various routes to which a toll or whether to use an expressway is applied. At 520, the electronic device may generate two or more initial route candidates, may provide the initial route candidates to the user, and may finally generate the initial route based on determination (or selection) of the user. Alternatively, the electronic device may arbitrarily determine the initial route without selection by the user (of shortest distance, shortest time, etc.).

In operation 530, the electronic device may determine a reference point(s). To this end, the electronic device may select the reference point(s) from a plurality of reference points stored in the electronic device or a server, and may determine that selected reference points should be provided for route guidance. (Various methods for determining a reference point will be described later with reference to FIG. 7.)

A plurality of reference points (e.g., reference point candidates) may be stored in a memory of the electronic device. The memory may store at least one of a reference point specified by a service provider, a reference point set by the user, a reference point obtained through an application of the electronic device, or a reference point obtained through user registration. Thus the plurality of reference points may include a reference point 531 set by a (service/product) provider, a reference point 533 that satisfies a condition set by the user, a reference point 535 detected from content (a message, an electronic mail, a text, or the like) input to the electronic device of the user or transmitted or received from the electronic device of the user to another electronic device, and a reference point 537 registered by the user using the electronic device or a wearable device.

The provider-set reference point 531 may be a reference point set by a service provider (e.g., a map application or navigation function provider, or an electronic device manufacturer). For example, landmarks, public offices, cultural assets, major road interchanges (ICs), schools, hospitals, or the like of each nation/region may be set to be used as reference points at the time of providing a product or an application. Information on such reference points may be stored in not only the electronic device but also a provider's server so as to be updated periodically.

The user-set reference point 533 may be a reference point set by the user. For example, the user may set a gas station, an airport, a military camp, a theater, a coffee shop, or the like so that the foregoing items are provided as reference points. In this case, corresponding items detected from map data may be classified as reference points. For example, in the case where the user sets a gas station as a reference point, the electronic device may provide a gas station as a reference point if the gas station is located near the initial route. In various embodiments of the present disclosure, the user may be aware of a point of the entire route at which a gas station is located. For example, the user may obtain in advance information indicating that there is no gas station until the user travels about 80% of the entire route after traveling 20% of the entire route. Using this information, the user may avoid the need to urgently search for a gas station by deviating from the route after a fuel warning light is turned on.

The user may set a specific brand or a chain store as a reference point. For example, if the user has set Starbucks® as a reference point, the electronic device may provide information on various Starbucks stores located near the initial route.

The data-collection-based reference point 535 may correspond to a place or a building obtained through analysis of data exchanged through the electronic device. For example, a place (e.g., a company address or the like) mentioned in electronic mail messages exchanged with a client through an electronic mail application may be collected as a reference point. Furthermore, a place mentioned in a message or an interactive application, a place mentioned using a specific tag in a social network service, or the like may be collected as a reference point. Furthermore, a place retrieved by the user through a map application or a navigation application, or a place, a regional name, a building, or the like input by the user as a search word to an Internet application may be collected as a reference point.

The data-collection-based reference point 535 may be a reference point provided from another user (or another user device). For example, when an appointment for a meeting between individuals at a downtown place is made, a user well acquainted with a selected meeting place may inform the other persons of available reference points and may describe a route using the reference points. For example, the appointment is made for meeting at a Starbucks store near the Gangnam station, one user may provide, to the other users, a guidance such as "Exit from gate 2 of the Gangnam station, and go strait until you reach City Bank, and then turn right. Then, turn left at Dunkin' Donuts and go straight until you see Starbucks at your right side." In this case, a point such as the "City Bank" or "Dunkin' Donuts" may be a reference point. According to a conventional navigation method, a guidance to the same place is provided in a manner such as, "Go straight A meters at the Gangnam Boulevard and turn right. Then, go straight B meters, turn left, and go straight C meters. Then, you arrive at the destination." However, according to this method, a user may have difficultly following the instructions, and the user may frequently miss an intersection, and may require help from a route guidance application or the like again when revisiting the same place. Accordingly, users may advantageously find desired destinations easier using the reference point based guidance of the present disclosure.

The reference point 537 based on user registration may be a reference point registered using a function or a menu of a specific application of the electronic device. This will be described in detail with reference to FIGS. 6A and 6B.

In operation 540, the electronic device may generate a final route by applying the determined reference points. In various embodiments of the present disclosure, the electronic device may display an existing route (e.g., the initial route) and the final route to which reference points are applied so that the user may select one route. For example, if the user selects a route including a guidance on reference points, a route guidance is provided using the final route, or, if the user selects the existing route (e.g., the initial route), a guidance on a route connecting a start point and a destination may be provided in an existing manner. In this case, the initial route may be determined as the final route.

In operation 550, the electronic device may provide a route guidance. The electronic device may provide a route guidance based on the methods described above with reference to FIGS. 2 to 4 or various combinations of these methods.

Figure 6A:
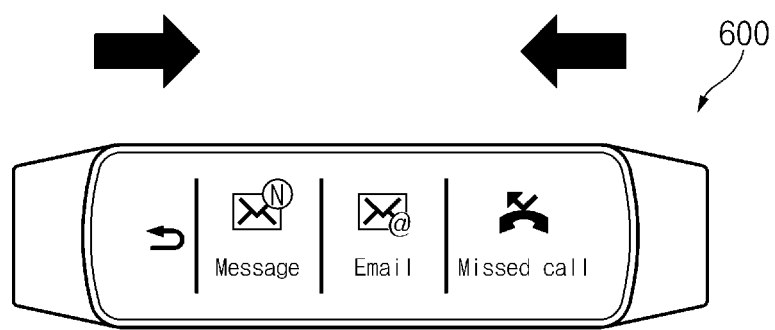
FIG. 6A illustrates a screen example on a wearable device, for generating a reference point through user registration according to various embodiments of the present disclosure.
Figure 6B:
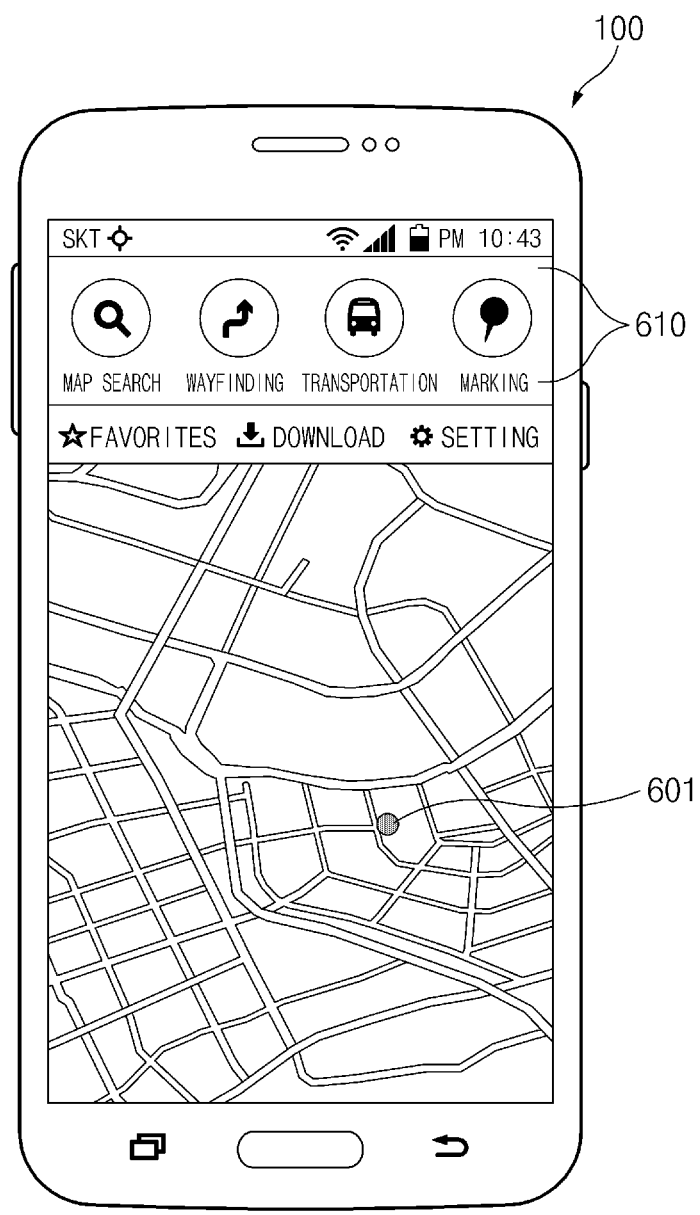
FIG. 6B illustrates a screen example on a portable device for generating a reference point through user registration according to various embodiments.

FIGS. 6A and 6B illustrate respective examples of generation of a reference point through user registration according to various embodiments of the present disclosure. As shown in FIG. 6A, a reference point may be generated using a wearable device 600. For example, the electronic device 100 shown in FIG. 6B may be communicatively connected to the wearable device 600 through a short-range network (e.g., Bluetooth, near field communication (NFC), IrDA, Bluetooth low energy (BLE), Wi-Fi, Wi-Fi direct, or the like). In various embodiments of the present disclosure, the electronic device 100 may be connected to the wearable device 600 through a mobile communication network (e.g., 3G, LTE, LTE-A, etc.).

The user may mark a corresponding place using a specified motion of the wearable device 600. For example, the wearable device may include a positioning module such as a GPS module to recognize a current location. Furthermore, if the user makes a prescribed motion, the wearable device may mark the current location and may store the marked current location or transmit the marked current location to device 100. (One example of such preset motion is a touch input performed by touching a display of the wearable device with fingers at left and right sides of the display and gliding the fingers towards a center of the display with continuous contact thereon.) A communication module of device 100 may receive, from the wearable device 600, information on a location where the marking motion has occurred. The received location information may be determined as the reference point 537 based on user registration.

Referring to FIG. 6B, a reference point may also be generated using the electronic device 100. For example, the user may input a gesture (e.g., dragging downwards from an upper end of a screen) for generating a toggle area 610 of the electronic device. A marking menu may be selected from various menus included in the generated area, and a marking on a current area or an arbitrary point on a map 601 may be generated. A point marked using the marking menu may be determined as the reference point 537 based on user registration.

In the example of FIG. 6A or 6B, a specific location of the electronic device or the wearable device may be obtained as GPS coordinates or the like. However there may be multiple places corresponding to a common point. For example, coordinates corresponding to the Gangnam station may be represented by a subway station, an intersection, a building name, or a name of a specific chain store (e.g., Starbucks). The electronic device or the wearable device may provide various options with respect to a marked point, and may store the point in association with representation selected by the user or transmit the point to another device.

Figure 7:
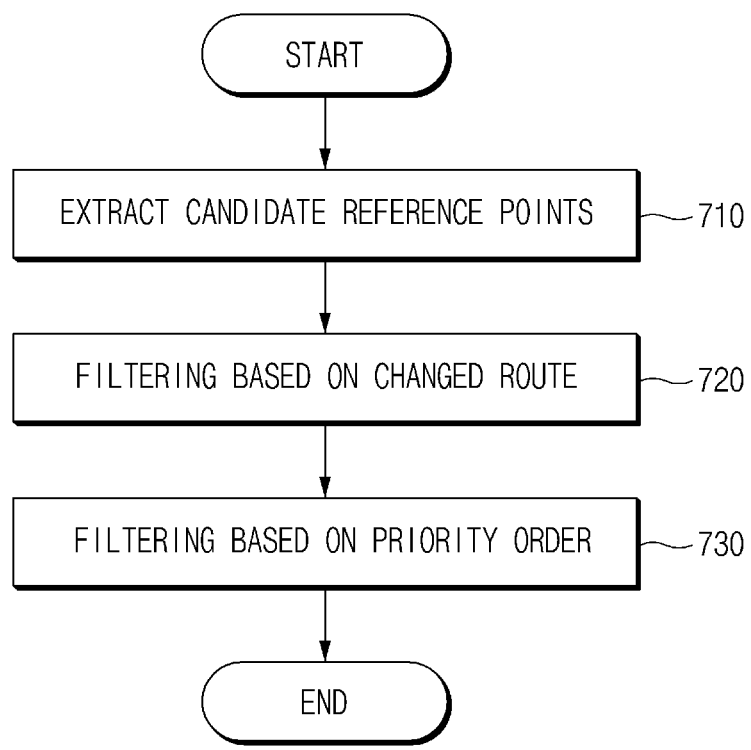
FIG. 7 illustrates a process of filtering reference points according to various embodiments of the present disclosure.

FIG. 7 illustrates a process of filtering reference points according to various embodiments of the present disclosure. In this process, an electronic device may first extract a candidate group of reference points in operation 710. For example, the electronic device may extract reference points that satisfy a specified condition as candidate reference points, from various reference points stored in the device's memory or present in a server. For instance, the electronic device may extract reference points distributed along a certain lineal distance from the initial route as the candidate reference points.

At 720, the electronic device may filter a portion of reference points based on a changed route. For example, the electronic device may reset the route so that a first reference point among the candidate reference points is included in the route. In the case where the initial route is a shortest route that connects a start point and a destination, the reset route may be a shortest route that connects the start point, the first reference point, and the destination. If the reset route is longer than the initial route by at least a specified distance, or if a time for traveling the reset route is longer than a time required for traveling the initial route by a specified time, the electronic device may filter (or exclude) the first reference point. If the first reference point is filtered, the electronic device may perform the same operation on a second reference point. If the first reference point is not filtered, the electronic device may add the first reference point as a reference point to be used for a route guidance.

At 730, the electronic device may filter reference points based on a priority order. For example, the electronic device may most preferentially determine a reference point based on user registration (e.g., the reference point 537) as a reference point, among the candidate reference points. In various embodiments, the electronic device may filter the candidate reference points in descending order according to popularity, e.g., based on a number of persons who have selected the candidate reference points as reference points. In various embodiments, the electronic device may determine a priority order by applying a weight to a use frequency, rating, popularity or the like of a reference point provided from users through an SNS application or the like, and may perform filtering based on the priority order.

The electronic device may determine a reference point by applying different priority orders according to a condition such as a time or season. For example, a reference point (e.g., a building, a store, or the like) provided in daytime may not be easily viewed by the user at night. In this case, at night, a reference point may be determined by applying a priority order to a large standing signboard, an electronic display board, or a store (e.g., a convenience store or a pub) open 24 hours or at night.

Operations 720 and 730 may be sequentially performed or selectively performed. For example, operations 710 and 730 alone may be performed in order to determine a reference point. Alternatively, operation 730 may be performed prior to operation 720. In this case, if a reference point determined as having a high priority changes a route to a higher degree than a threshold range, the electronic device may request the user to confirm whether to pass through the reference point. As described above, since the entire route may not include a reference point, a guidance on the reference point may be provided without adding the reference point to a moving route if the reference point is recognizable by the user who simply travels along the route.

A method for providing a route guidance by an electronic device according to various embodiments of the present disclosure may include obtaining information on a plurality of points, determining one or more reference points based at least on the obtained information, and providing a route guidance including information on the reference points.

In various embodiments of the present disclosure, the route may be determined based on the plurality of points or the plurality of points and at least a portion of the reference points.

In various embodiments of the present disclosure, the providing of the route guidance may include providing information on a ratio of a distance traveled to the reference point to a length of an entire route. Furthermore, the providing of the route guidance may include providing a turn-by-turn guidance at a route point included in the entire route together with the information on the reference points.

In various embodiments of the present disclosure, the determining of the reference points may include setting an initial route based on the plurality of points, and determining a candidate reference point located within a specified distance from the initial route as the reference point, among candidate reference points.

In various embodiments of the present disclosure, the determining of the reference points may include determining an arbitrary candidate reference point as the reference point if an amount of increase in a moving distance or a moving time due to a virtual route including the arbitrary candidate reference point is equal to or less than a reference value.

In various embodiments of the present disclosure, the determining of the reference points may include determining the reference points among the candidate reference points according to a specified priority order.

In various embodiments of the present disclosure, the determining of the reference point may include automatically determining a portion of the candidate reference points as the reference points and determining the other candidate reference points as the reference points based on a user input.

In various embodiments of the present disclosure, the determining of the reference points may include determining a point received from an external device as the reference point.

In various embodiments of the present disclosure, the determining of the reference points may include determining an initial route connecting the plurality of points based on the obtained information, and determining the one or more reference points based on the initial route.

In various embodiments of the present disclosure, the providing of the route guidance may include generating a final route based on the initial route and a portion of the reference points, and providing, based on the final route, the information on the reference points and information on a route point included in the final route. Another portion (the rest portion) of the reference points may not be included in the final route.

Figure 8:
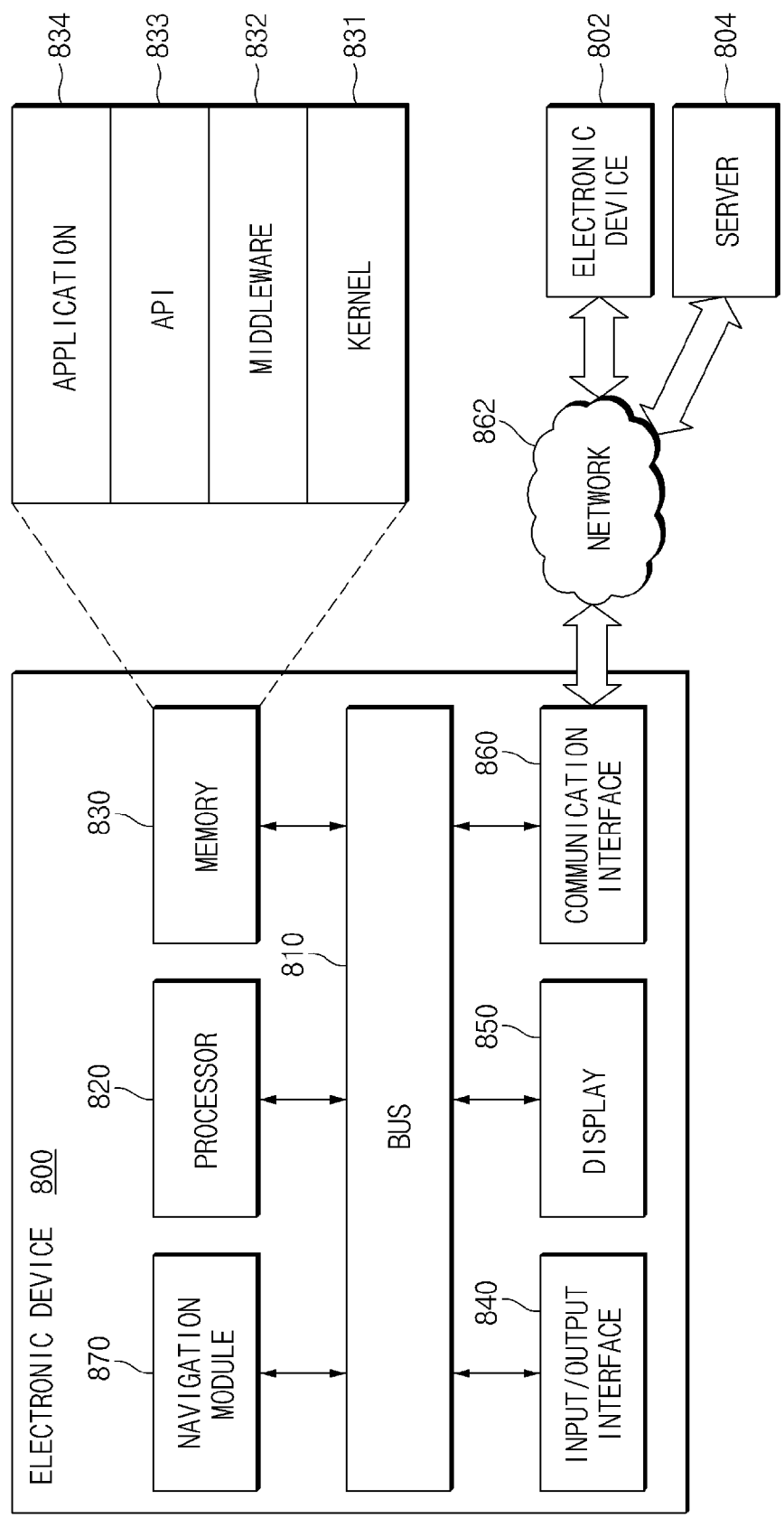
FIG. 8 is diagram illustrating a configuration of an electronic device and a communication environment according to various embodiments of the present disclosure.

FIG. 8 is diagram illustrating a configuration of an electronic device, 800, and a communication environment according to various embodiments of the present disclosure. Device 800 is an example of electronic device 100 shown and described above. Electronic device 800 may include at least one of a bus 810, a processor 820, a memory 830, an input/output interface 840, a display 850, a communication interface 860, and a navigation module 870.

The bus 810 may be a circuit for connecting the above-mentioned elements to each other and transferring communications (e.g., control messages) between the above-mentioned elements.

The processor 820 may receive a command from another element (e.g., the memory 830, the input/output interface 840, the display 850, the communication interface 860, or the navigation module 870) through the bus 810, may interpret the received command, and may perform an operation or data processing according to the interpreted command.

The memory 830 may store a command or data received from or generated by the processor 820 or another element (e.g., the input/output interface 840, the display 850, the communication interface 860, or the navigation module 870). The memory 830 may include programming modules such as a kernel 831, a middleware 832, an application programming interface (API) 833, or an application 834. Each programming module may include software, firmware, hardware, or a combination of at least two thereof. The memory 830 may include information such as the reference point 531 set by a (service/product) provider, the reference point 533 that satisfies a condition set by the user, the reference point 535 detected from content (a message, an electronic mail message, a text, or the like) input to the electronic device of the user or transmitted or received from the electronic device of the user to another electronic device, and the reference point 537 registered by the user using the electronic device or a wearable device.

The kernel 831 may control or manage system resources (e.g., the bus 810, the processor 820, or the memory 830) used to perform an operation or a function of another programming module, for example, the middleware 832, the API 833, or the application 834. Furthermore, the kernel 831 may provide an interface for the middleware 832, the API 833 or the application 834 to access individual elements of the electronic device 800 in order to control or manage the elements.

The middleware 832 may serve as an intermediary between the API 833 or the application 834 and the kernel 831 so that the API 833 or the application 834 communicates and exchanges data with the kernel 831. Furthermore, the middleware 832 may perform a control operation (e.g., scheduling or load balancing) with respect to operation requests received from the application 834 by using, e.g., a method of assigning a priority for using system resources (e.g., the bus 810, the processor 820, or the memory 834) of the electronic device 800 to at least one application 834.

The API 833, which is an interface for allowing the application 834 to control a function provided by the kernel 831 or the middleware 832, may include at least one interface or function (e.g., a command) for, for example, file control, window control, image processing, or character control.

Application 834 may include an SMS/MMS application, an electronic mail application, a calendar application, an alarm application, a health care application (e.g., an application for measuring an amount of exercise or blood sugar), an environment information application (e.g., an application for providing barometric pressure, humidity or temperature information), a map application, or a navigation application. Additionally or alternatively, the application 834 may be an application related to information exchange between the electronic device 800 and an external electronic device (e.g., an electronic device 802 or a server 804). The application related to information exchange may include, for example, a notification relay application for transferring specific information to the external electronic device or a device management application for managing the external electronic device.

For example, the notification relay application may include a function of transferring notification information generated by another application of the electronic device 800 (e.g., an SMS/MMS application, an electronic mail application, a health care application, or an environment information application) to an external electronic device (e.g., the electronic device 802 or the server 804). Additionally or alternatively, the notification relay application may receive notification information from an external electronic device (e.g., the electronic device 802 or the server 804) and may provide the notification information to a user. The device management application may manage (e.g., install, uninstall or update) a function (e.g., turning on/off an external electronic device (or a component thereof) or adjusting brightness (or resolution) of a display) of at least a part of the external electronic device (e.g., the electronic device 802 or the server 804) that communicates with the electronic device 800, an application operated in the external electronic device, or a service (e.g., a call service or a messaging service) provided from the external electronic device.

The application 834 may include a specific application according to an attribute (e.g., the type of an electronic device) of the external electronic device (e.g., the electronic device 802 or the server 804). For example, if the external electronic device is an MP3 player, the application 834 may include an application related to playback of music. As another example, if the external electronic device is a mobile medical device, the application 834 may include an application related to health care. Application 834 may include at least one of a specific application for the electronic device 800 or an application received from the external electronic device (e.g., the electronic device 802 or the server 804).

The input/output interface 840 may transfer a command or data input by a user through an input/output device (e.g., a sensor, a keyboard or a touch screen) to the processor 820, the memory 830, the communication interface 860, or the navigation module 870 through, for example, the bus 810. For example, the input/output interface 840 may provide, to the processor 820, data about a touch of the user on a touch screen. Furthermore, the input/output interface 840 may output, through the input/output device (e.g., a speaker or a display), for example, the command or data received from the processor 820, the memory 830, the communication interface 860, or the navigation module 870 through the bus 810. For example, the input/output interface 840 may output voice data processed by the processor 820 to the user through a speaker.

The display 850 may display various information (e.g., multimedia data, text data, map data, or the like) to the user.

The communication interface 860 may establish a communication connection between the electronic device 800 and an external electronic device (e.g., the electronic device 802 or the server 804). For example, the communication interface 860 may be connected to the network 862 based on a wireless or wired communication technology so as to communicate with the external device. The wireless communication technology may include at least one of wireless fidelity (Wi-Fi), Bluetooth (BT), near field communication (NFC), global positioning system (GPS), or cellular communication (e.g., LTE, LTE-A, CDMA, WCDMA, UMTS, WiBro, or GSM). The wired communication technology may include at least one of universal serial bus (USB), high definition multimedia interface (HDMI), recommended standard 232 (RS-232), or plain old telephone service (POTS).

Network 862 may be a telecommunications network. The telecommunications network may include at least one of a computer network, the Internet, the Internet of things (IoT), or a telephone network.

A protocol (e.g., a transport layer protocol, a data link layer protocol, or a physical layer protocol) for communication between the electronic device 800 and the external device may be supported by at least one of the application 834, the application programming interface 833, the middleware 832, the kernel 831, the communication interface 860, or the navigation module 870.

The navigation module 870 may set a route based on obtained information and may provide a guide on the set route to the input/output interface 840, the display 850, an audio module described below, or the like. In various embodiments of the present disclosure, the navigation module 870 may be construed as a navigation engine. In various embodiments of the present disclosure, the navigation module 870 may be construed as one control module together with the processor 820, and may be implemented with one system on chip (SoC). The navigation module 870 may obtain data on reference points stored in the memory 830, and may extract, filter or determine reference points to be applied to a route setting.

Navigation module 870 may process at least a part of information obtained from another element (e.g., the processor 820, the memory 830, the input/output interface 840, or the communication interface 860), and may provide the processed information to the communication module (e.g., the communication interface 860) in various ways. For example, the navigation module 870 may provide information on obtained or determined reference points to another electronic device (e.g., the electronic device 802 or the server 804). The navigation module 870 may provide information on an initial or final route generated to another element or another electronic device (e.g., the electronic device 802 or the server 804).

An electronic device (e.g., the electronic device 800) for providing a route guidance according to various embodiments of the present disclosure may include an input/output interface (e.g., the interface 840) for obtaining at least one destination information, a memory (e.g., the memory 830) for storing information on a plurality of reference points, and a control module (e.g., the processor 820 or the navigation module 870) for determining, based at least on the destination information, a portion of the plurality of reference points as reference points to be provided for a route guidance, wherein the control module may be configured to provide the route guidance including information on the determined reference points.

In various embodiments of the present disclosure, the electronic device may further include a positioning module for determining a current location of the electronic device, wherein the control module may be configured to provide the route guidance using the current location as start point information.

In various embodiments of the present disclosure, the memory may store, as the plurality of reference points, at least one of a reference point specified by a service provider, a reference point set by a user, a reference point obtained through an application of the electronic device, or a reference point obtained through user registration.

In various embodiments of the present disclosure, the electronic device may further include a communication module (e.g., the communication interface 860) for connection to a wearable device interworking with the electronic device, wherein the communication module may receive information on a location where a specified marking motion has occurred on the wearable device, wherein the reference point obtained through user registration may correspond to the information on the location where the marking motion has occurred.

In various embodiments of the present disclosure, the control module may be configured to parse content transmitted or received through the application, and store, in the memory, an arbitrary point obtained as a result of parsing as the reference point obtained through the application.

In various embodiments of the present disclosure, the control module may be configured to reset the route so that the route includes at least a portion of the determined reference points.

In various embodiments of the present disclosure, at least a portion of the reference points may not be included in the route or may be positioned in a straight section of the route.

Figure 9:
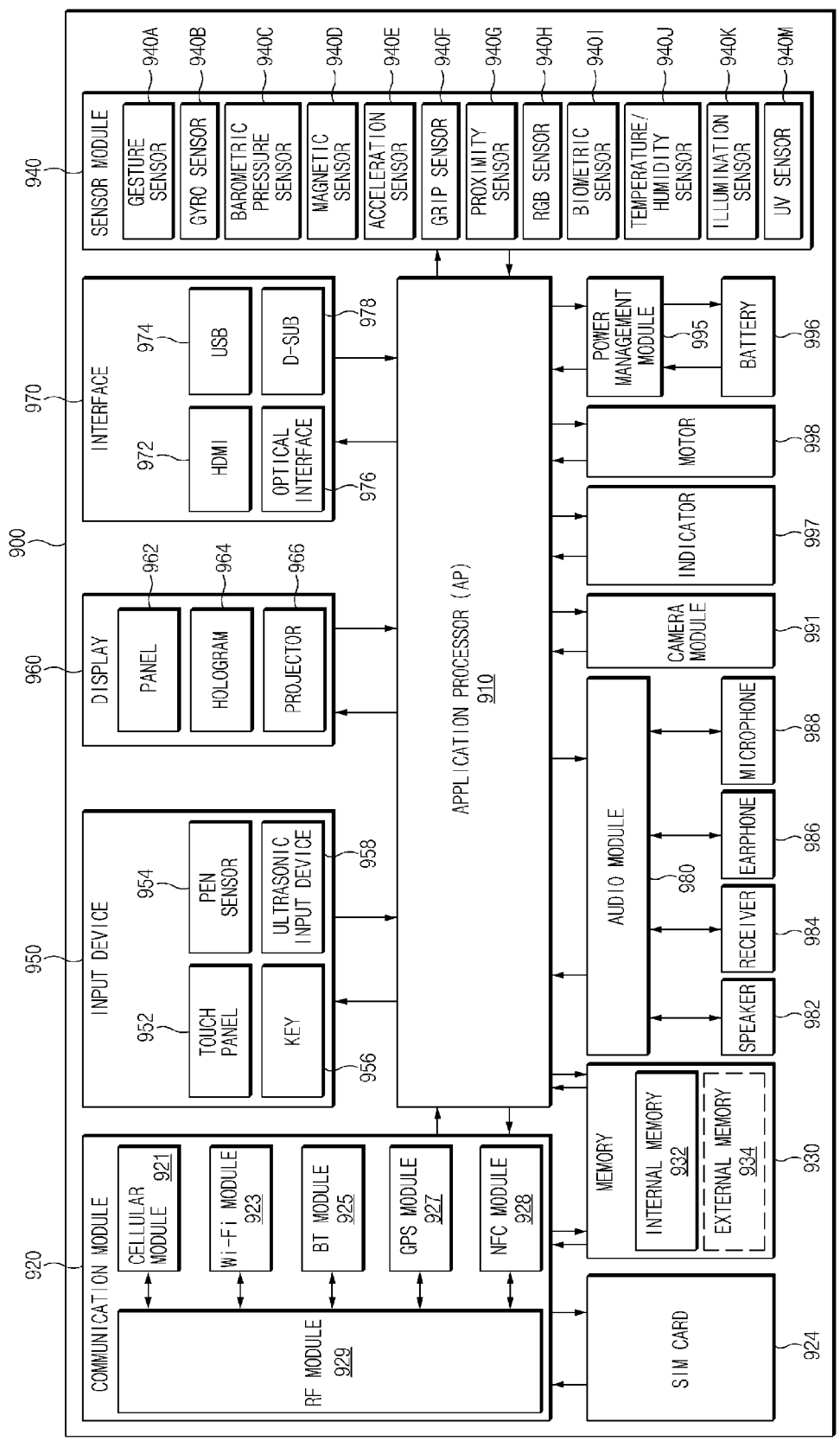
FIG. 9 is a block diagram illustrating a hardware configuration of an electronic device according to various embodiments of the present disclosure.

FIG. 9 is a block diagram illustrating a hardware configuration of an electronic device according to various embodiments of the present disclosure. Electronic device 900 may constitute, for example, a part or the entirety of the electronic device 800 illustrated in FIG. 8. Electronic device 900 is also an example of electronic device 100 shown and described above. As shown in FIG. 9, the electronic device 900 may include at least one of at least one application processor (AP) 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, or a motor 998.

The AP 910 (e.g., the processor 820) may control a plurality of hardware or software elements connected to the AP 910 by running an operating system or an application program, and may process various data including multimedia data and may perform an operation. The AP 910 may be implemented with, for example, a system on chip (SoC). According to an embodiment of the present disclosure, the AP 910 may further include a graphic processing unit (GPU) (not shown).

The communication module 920 (e.g., the communication interface 860) may perform data transmission/reception for communication between the electronic device 900 (e.g., the electronic device 800) and another electronic device (e.g., the electronic device 802 or the server 804) connected thereto through a network. Communication module 920 may include a cellular module 921, a Wi-Fi module 923, a BT module 925, a GPS module 927, an NFC module 928, and a radio frequency (RF) module 929.

The cellular module 921 may provide a voice call service, a video call service, a text message service, or an Internet service through a telecommunications network (e.g., an LTE, LTE-A, CDMA, WCDMA, UMTS, WiBro or GSM network). Furthermore, the cellular module 921 may identify and authenticate electronic devices in the telecommunications network using, for example, a subscriber identification module (e.g., the SIM card 924). Cellular module 921 may perform at least a part of functions provided by the AP 910. For example, the cellular module 921 may perform at least a part of a multimedia control function.

Cellular module 921 may include a communication processor (CP). The cellular module 921 may be implemented with, for example, an SoC. Although FIG. 9 illustrates that the cellular module 921 (e.g., a CP), the memory 930, and the power management module 995 are separated from the AP 910, the AP 910 may include at least a part of the foregoing elements (e.g., the cellular module 921).

AP 910 or the cellular module 921 (e.g., a CP) may load, on a volatile memory, a command or data received from nonvolatile memories connected to the AP 910 and the cellular module 921 respectively or at least one of other elements, so as to process the command or data. Furthermore, the AP 910 or the cellular module 921 may store, in the nonvolatile memory, data received from or generated by at least one of the other elements.

Each of the Wi-Fi module 923, the BT module 925, the GPS module 927, and the NFC module 928 may include, for example, a processor for processing data transmitted/received through the modules. FIG. 9 illustrates that the cellular module 921, the Wi-Fi module 923, the BT module 925, the GPS module 927, and the NFC module 928 are separate blocks. However, at least a part (e.g., two or more) of the cellular module 921, the Wi-Fi module 923, the BT module 925, the GPS module 927, and the NFC module 928 may be included in a single integrated chip (IC) or IC package. For example, at least a part of processors corresponding to the cellular module 921, the Wi-Fi module 923, the BT module 925, the GPS module 927, and the NFC module 928 respectively (e.g., a communication processor corresponding to the cellular module 921 and a Wi-Fi processor corresponding to the Wi-Fi module 923) may be implemented with a single SoC.

The RF module 929 may transmit/receive data, for example, may transmit/receive RF signals. Although not illustrated, for example, a transceiver, a power amp module (PAM), a frequency filter or a low noise amplifier (LNA) may be included in the RF module 929. Furthermore, the RF module 929 may further include a component such as a conductor or a wire for transmitting/receiving free-space electromagnetic waves in a wireless communication system. FIG. 9 illustrates that the cellular module 921, the Wi-Fi module 923, the BT module 925, the GPS module 927, and the NFC module 928 share the single RF module 929. However, according to an embodiment of the present disclosure, at least one of the cellular module 921, the Wi-Fi module 923, the BT module 925, the GPS module 927, or the NFC module 928 may transmit/receive RF signals through an additional RF module.

The SIM card 924 may include a subscriber identification module, and may be inserted into a slot formed at a specific portion of the electronic device. The SIM card 924 may include unique identification information (e.g., an integrated circuit card identifier (ICCID)) or subscriber information (e.g., international mobile subscriber identity (IMSI)).

The memory 930 (e.g., the memory 830) may include an internal memory 932 or an external memory 934. The internal memory 932 may include at least one of a volatile memory (e.g., a dynamic RAM (DRAM), a static RAM (SRAM) or a synchronous dynamic RAM (SDRAM)) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 932 may be a solid state drive (SSD). The external memory 934 may include a flash drive, for example, compact flash (CF), secure digital (SD), micro secure digital (Micro-SD), mini secure digital (Mini-SD), extreme digital (xD), a memory stick, or the like. The external memory 934 may be functionally connected to the electronic device 900 through various interfaces. According to an embodiment of the present disclosure, the electronic device 900 may further include a storage device (or a storage medium) such as a hard drive.

The sensor module 940 may measure physical quantity or detect an operation state of the electronic device 900 so as to convert measured or detected information into an electrical signal. The sensor module 940 may include, for example, at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 540H (e.g., a red/green/blue (RGB) sensor), a biometric sensor 9401, a temperature/humidity sensor 940J, an illumination sensor 940K, or an ultraviolet (UV) sensor 940M. Additionally or alternatively, the sensor module 940 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, a fingerprint sensor, or the like. The sensor module 940 may further include a control circuit for controlling at least one sensor included therein.

The input device 950 may include a touch panel 952, a (digital) pen sensor 954, a key 956, or an ultrasonic input device 958. The touch panel 952 may recognize a touch input using at least one of capacitive, resistive, infrared, and ultraviolet sensing methods. The touch panel 952 may further include a control circuit. In the case of using the capacitive sensing method, a physical contact recognition or proximity recognition is allowed. The touch panel 952 may further include a tactile layer. In this case, the touch panel 952 may provide tactile reaction to a user.

The (digital) pen sensor 954 may be implemented in a similar or same manner as the method of receiving a touch input of a user or may be implemented using an additional sheet for recognition. The key 956 may include, for example, a physical button, an optical button, or a keypad. The ultrasonic input device 958, which is an input device for generating an ultrasonic signal, may enable the electronic device 900 to sense a sound wave through a microphone (e.g., a microphone 988) so as to identify data, wherein the ultrasonic input device 958 is capable of wireless recognition. According to an embodiment of the present disclosure, the electronic device 900 may use the communication module 920 so as to receive a user input from an external device (e.g., a computer or a server) connected to the communication module 920.

The display 960 (e.g., the display 850) may include a panel 962, a hologram device 964, or a projector 966. The panel 962 may be, for example, a liquid crystal display (LCD), an active-matrix organic light-emitting diode (AM-OLED) display, or the like The panel 962 may be, for example, flexible, transparent or wearable. The panel 962 and the touch panel 952 may be integrated into a single module. The hologram device 964 may display a stereoscopic image in a space using a light interference phenomenon. The projector 966 may project light onto a screen so as to display an image. The screen may be disposed in the inside or the outside of the electronic device 900. According to an embodiment of the present disclosure, the display 960 may further include a control circuit for controlling the panel 962, the hologram device 964, or the projector 966.

The interface 970 may include, for example, a high-definition multimedia interface (HDMI) 972, a universal serial bus (USB) 974, an optical interface 976, or a D-subminiature 978. The interface 970 may be included in the communication interface 860 illustrated in FIG. 8. Additionally or alternatively, the interface 970 may include, for example, a mobile high-definition link (MHL) interface, a secure digital (SD) card/multi-media card (MMC) interface, or an infrared data association (IrDA) interface.

The audio module 980 may convert a sound into an electrical signal or vice versa. At least a part of elements of the audio module 980 may be included in the input/output interface 840 illustrated in FIG. 8. The audio module 980 may process sound information input or output through a speaker 982, a receiver 984, an earphone 986, or the microphone 988.

Camera module 991 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 995 may manage power of the electronic device 900. Although not illustrated, a power management integrated circuit (PMIC), a charger integrated circuit (IC), or a battery or fuel gauge may be included in the power management module 995.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method and the wireless charging method. The wireless charging method may include, for example, a magnetic resonance method, a magnetic induction method, an electromagnetic method, or the like, and may include an additional circuit, for example, a coil loop, a resonant circuit, a rectifier, or the like.

The battery gauge may measure, for example, a remaining capacity of the battery 996 and a voltage, current or temperature thereof while the battery is charged. The battery 996 may store or generate electricity, and may supply power to the electronic device 900 using the stored or generated electricity. The battery 996 may include, for example, a rechargeable battery or a solar battery.

The indicator 997 may indicate a specific state of the electronic device 900 or a part thereof (e.g., the AP 910), such as a booting state, a message state, a charging state, or the like. The motor 998 may convert an electrical signal into a mechanical vibration. Although not illustrated, a processing device (e.g., a GPU) for supporting a mobile TV may be included in the electronic device 900. The processing device for supporting a mobile TV may process media data according to the standards of digital multimedia broadcasting (DMB), digital video broadcasting (DVB), or MediaFLO™.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific integrated circuit (ASIC) chip, a field-programmable gate array (FPGA), or a programmable-logic device for performing some operations, which is known or will be developed.

According to various embodiments of the present disclosure, at least a part of devices (e.g., modules or functions thereof) or methods (e.g., operations) according to various embodiments of the present disclosure may be implemented as instructions stored in a non-transitory computer-readable storage medium in the form of a programming module. In the case where the instructions are performed by at least one processor (e.g., the processor 822), the at least one processor may perform functions corresponding to the instructions. The computer-readable storage medium may be, for example, the memory 830. At least a part of the programming module may be implemented (e.g., executed) by the processor 210. At least a part of the programming module may include, for example, a module, a program, a routine, sets of instructions, or a process for performing at least one function.

The computer-readable recording medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions (e.g., a programming module), such as a read only memory (ROM), a random access memory (RAM), a flash memory, or the like. The program instructions may include machine language codes generated by compilers and high-level language codes that can be executed by computers using interpreters. The above-mentioned hardware may be configured to be operated as one or more software modules for performing operations of various embodiments of the present disclosure and vice versa.

The module or programming module according to various embodiments of the present disclosure may include at least one of the above-mentioned elements, or some elements may be omitted or other additional elements may be added. Operations performed by the module, the programming module or the other elements may be performed in a sequential, parallel, iterative or heuristic way. Furthermore, some operations may be performed in another order or may be omitted, or other operations may be added.

According to various embodiments of the present disclosure, a storage medium stores commands executed by at least one processor to instruct the at least one processor to perform at least one operation, wherein the at least one operation may include obtaining information on a plurality of points, determining one or more reference points based on the obtained information, and providing a route guidance including information on the reference points.

According to various embodiments of the present disclosure, a route divided based on reference points is generated and recognized by a user, so that the user may more clearly understand the entire route.

Furthermore, according to various embodiments of the present disclosure, information on places that are familiar to and can be easily found by a user is applied to route design based on user experience, so that the user may intuitively and quickly understand a route.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. A method for providing a route guidance by an electronic device, the method comprising:
    obtaining information on a plurality of points;
    storing a group of reference points in a memory or an external server;
    determining by a processor, one or more reference points from the group of the reference points on a basis of at least the obtained information;
    displaying a route guidance with the one or more reference points on a display screen,
    wherein the determining the one or more reference points comprises: setting an initial route based on the plurality of points; and determining one or more candidate reference points located within a specified distance from the initial route as the one or more reference points from the group of the reference points wherein the providing of the route guidance comprises providing information on a ratio of a distance traveled to the reference point to a length of an entire route.

2. The method of claim 1, wherein the route is determined on a basis of the plurality of points or the plurality of points and at least a portion of the one or more reference points.

3. The method of claim 1, wherein the displaying the route guidance comprises displaying a turn-by-turn guidance at a route point included in an entire route together with the one or more reference points.

4. The method of claim 1, wherein the determining the one or more reference points comprises determining an arbitrary candidate reference point as the reference point if an amount of increase in a moving distance or a moving time due to a virtual route including the arbitrary candidate reference point is equal to or less than a reference value.

5. The method of claim 1, wherein the determining the one or more reference points comprises determining the one or more reference points from the group of the reference points according to a specified priority order.

6. The method of claim 1, wherein the determining the one or more reference points comprises automatically determining a portion of the group of the one or more reference points as the reference points and determining another portion of the group of the one or more reference points as the reference points on a basis of a user input.

7. The method of claim 1, wherein the determining the one or more reference points includes determining a point received as the reference point from a wireless or wired external terminal connected to the electronic device.

8. The method of claim 1, wherein the determining the one or more reference points comprises:
determining an initial route connecting the plurality of points on a basis of the obtained information; and
determining the one or more reference points on a basis of the initial route.

9. The method of claim 8, wherein the providing of the route guidance comprises:
generating a final route on a basis of the initial route and a portion of the reference points; and
providing, on a basis of the final route, the information on the reference points and information on a route point included in the final route.

10. The method of claim 9, wherein another portion of the reference points is not included in the final route.

11. An electronic device for providing a route guidance, the electronic device comprising:
an input/output interface obtaining at least one destination information;
a memory storing information on a group of reference points;
a controller determining, on a basis of at least the destination information, one or more reference points from the group of the reference points to be provided for a route guidance; and
a display screen displaying the route guidance with the one or more reference points,
wherein the controller is configured to provide the route guidance including information on the determined one or more reference points, and wherein the determining of the one or more reference points includes: setting an initial route based on the group of reference points; and
determining the one or more reference points from the group of the reference points located within a specified distance from the initial route; and
wherein the providing of the route guidance comprises providing information on a ratio of a distance traveled to the reference point to a length of an entire route.

12. The electronic device of claim 11, further comprising:
a positioning module for determining a current location of the electronic device,
wherein the controller provides the route guidance using the current location as start point information.

13. The electronic device of claim 11, wherein the memory stores, as the group of the reference points, at least one of a reference point specified by a service provider, a reference point set by a user, a reference point obtained through an application of the electronic device, or a reference point obtained through user registration.

14. The electronic device of claim 13, further comprising:
a communication module for connection to a wearable device interworking with the electronic device,
wherein the communication module receives information on a location where a specified marking motion has occurred on the wearable device,
wherein the reference point obtained through user registration corresponds to the information on the location where the marking motion has occurred.

15. The electronic device of claim 13, wherein the controller parses content transmitted or received through the application, and stores, in the memory, an arbitrary point obtained as a result of parsing as the reference point obtained through the application.

16. The electronic device of claim 11, wherein the controller resets the route so that the route includes at least a portion of the determined one or more reference points.

17. The electronic device of claim 11, wherein the at least a portion of the reference points is not included in the route or is positioned in a straight section of the route.

18. A recording medium for storing computer-readable commands which instruct an electronic device to perform:
obtaining information on a plurality of points;
storing a group of reference points in a memory or an external server;
determining one or more reference points from the group of the reference points on a basis of at least the obtained information; and
displaying a route guidance the one or more reference points on a display screen, wherein the determining the one or more reference points includes: setting an initial route based on the plurality of points;
determining one or more candidate reference points located within a specified distance from the initial route as the one or more reference points from the group of the reference points and
wherein the displaying the route guidance comprises displaying information on a ratio of a distance traveled to the one or more reference point to a length of an entire route.

* * * * *